US012716526B2

(12) United States Patent
Putler

(10) Patent No.: US 12,716,526 B2
(45) Date of Patent: Aug. 25, 2026

(54) ANOLYTE HOSE GUIDE

(71) Applicant: TOYOTA MOTOR ENGINEERING & MANUFACTURING NORTH AMERICA, INC., Plano, TX (US)

(72) Inventor: Phillip L. Putler, Dale, IN (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 829 days.

(21) Appl. No.: 17/956,712

(22) Filed: Sep. 29, 2022

(65) Prior Publication Data

US 2024/0110644 A1 Apr. 4, 2024

(51) Int. Cl.

*C25D 13/22* (2006.01)
*F16L 3/12* (2006.01)
*F16L 3/127* (2006.01)

(52) U.S. Cl.

CPC ........... *F16L 3/1226* (2013.01); *F16L 3/1218* (2013.01); *F16L 3/127* (2013.01)

(58) Field of Classification Search

None

See application file for complete search history.

(56) References Cited

U.S. PATENT DOCUMENTS 4,755,273 A * 7/1988 Bassett .................. C25D 13/22 118/501
2004/0201237 A1 10/2004 Wright
2009/0134283 A1 5/2009 Schulz
2021/0354881 A1 11/2021 Yamada

FOREIGN PATENT DOCUMENTS

CN 213954533 U 8/2021
EP 2060832 A2 5/2009
GB 2512580 A 10/2014
JP 08135995 * 5/1996 ................ F16L 3/08

* cited by examiner

*Primary Examiner* — Stefanie S Wittenberg

(74) *Attorney, Agent, or Firm* — SHEPPARD, MULLIN, RICHTER & HAMPTON LLP; Daniel N. Yannuzzi

(57) ABSTRACT

Systems and methods herein provide for an anolyte hose guide to optimize anolyte flow of an electrodeposition coating system. According to some embodiments, a flexible member guide is disclosed that has a guide channel adapted to receive a flexible member and shaped so as to direct an end of the flexible member into a membrane housing of an anode cell for use during an electrodeposition coating process. Examples disclosed herein receive the flexible member via a first direction and direct the end of the flexible member into the anode cell via a second direction, which is perpendicular to the first direction. The flexible member guide also include a mounting structure having a fork-like extending in the second direction providing for a mounting space configured to receive a rim of the anode cell.

20 Claims, 5 Drawing Sheets

ANOLYTE HOSE GUIDE

TECHNICAL FIELD

The present disclosure relates to devices and methods for electrodeposition coating, and in particular, some implementations may relate to an anolyte hose guide to optimize anolyte flow of an electrodeposition coating system.

DESCRIPTION OF RELATED ART

Electrodeposition coating involves an electrocoat (E-Coat) paint applied as a base layer to many vehicles. The E-Coat provides corrosion resistance and physical durability. Anode cells (also known as anolyte cells, and electrodialysis cells), play a dual role in the electrocoat painting process: anode cells act as an opposing electrode to the car body, and remove excess acid generated in the paint bath during the electrodeposition process.

BRIEF SUMMARY OF THE DISCLOSURE

According to various embodiments of the disclosed technology, systems, devices, and methods are provided receiving a flexible member in a guide channel shaped so as to direct an end of the flexible member into a membrane housing of an anode cell for use during an electrodeposition coating process.

In accordance with some embodiments an anolyte hose guide for electrodeposition coating is provided. The anolyte hose guide includes a body, a guide structure, and a mounting structure. The body comprises a first side, a second side, a third side, and fourth side. The guide structure comprises a guide surface between a first side guide member and a second side guide member forming a guide channel recessed into the body. The guide channel comprises a first portion extending in a first direction from a first end on the first side toward the third side, a second portion extending from a second end on the second side toward the fourth side in a second direction, perpendicular to the first direction, and a third portion comprising a curvature so as to join the first portion to the second portion. The mounting structure extends from the second end toward the fourth side in the second direction, and comprises a first mounting structure, second mounting structure, and a mounting space between the first and second mounting structures.

In another aspect, a system for electrodeposition coating is provided. The system comprises a flexible member configured to transport excess acid from an electrodeposition coating (E-Coating) bath during E-Coating of an object; an anode cell comprising a membrane housing for housing a membrane; and a flexible member guide configured to receive the flexible member in a first direction via a guide channel and direct an end of the flexible member into the membrane housing along a second direction that is perpendicular to the first direction. The flexible member guide comprises a mounting structure comprising a plurality of mounting tines and at least one space between the plurality of mounting tines and configured to receive a rim of the membrane housing.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein are directed to flexible member guides having a guide channel adapted to receive a flexible member and shaped so as to direct an end of the flexible member into a membrane housing of an anode cell for use during an electrodeposition coating process. The embodiments disclosed herein receive the flexible member via a first direction and direct the end of the flexible member into the anode cell via a second direction, which is perpendicular to the first direction. The flexible member guide according to the embodiments disclosed herein also include a mounting structure having a fork-like structure in which a plurality of mounting tines (or mounting structures) that extend in the second direction and form at least one mounting space configured to receive a rim of the anode cell.

As used herein "approximately" and "generally" refer to manufacturing tolerances of permissible variations in physical properties of the embodiments disclosed herein. Dimensions, orientations, and/or configurations disclosed herein may have some acceptable variation withing manufacturing tolerances without significantly affecting functioning of the disclosed embodiments. For example, while parallel and perpendicular relative arrangements and directions may be ideal, such configurations may not be perfectly achievable. Thus, approximately perpendicular and the like refers to a relative orientation or configuration within manufacturing tolerances. Similarly, generally linear and the like refers to a configuration within manufacturing tolerances.

Figures 1A, 1B:
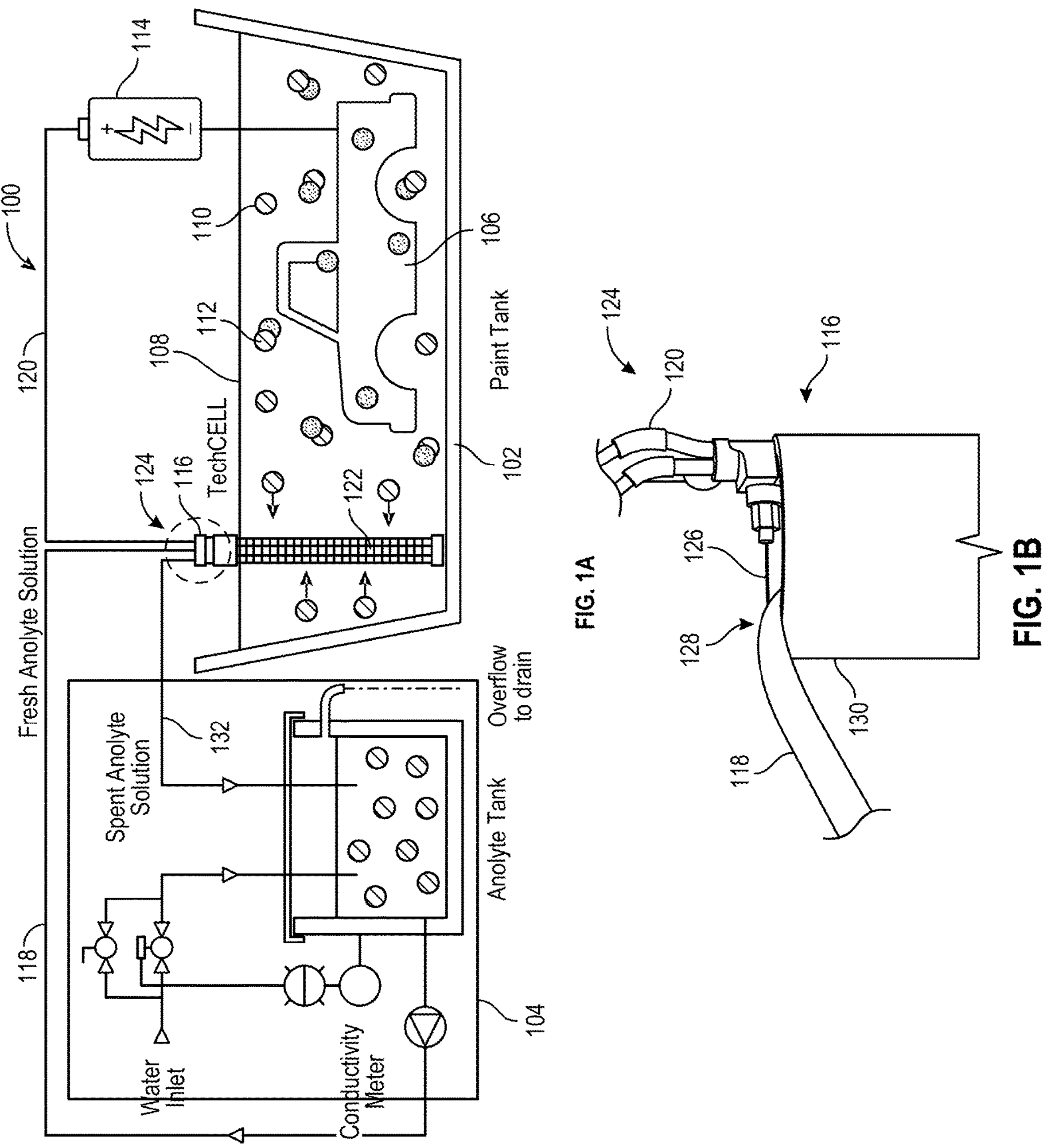
FIG. 1A is a schematic diagram of an anode cells and anolyte circulation system for applying E-Coat paint to a metallic object, in which embodiments disclosed herein can be implemented.
FIG. 1B is a zoomed in view of a region of the system of FIG. 1A.

FIG. 1A is a schematic diagram of an anode cells and anolyte circulation system 100 for applying E-Coat paint to a metallic object 106 (illustratively shown as a metal body of a vehicle body). The system includes a tank 102 containing an E-coat bath 108 during electrodeposition coating process. The E-coat bath 108 is consists of deionized water and solubilized paint 112. Paint 112 is applied to the metallic object 106 using a regulated amount of voltage, for example, supplied via power source 114, to achieve a desire paint thickness on object 106. Once the paint reaches the prescribed thickness, the object 106 "insulates" and the coating process slows down. As the object 106 exits the tank 102, paint 112 that cling to the surface are rinsed off to maintain application efficiency and aesthetics.

An anode cell 116 is connected to the power source 114 via wired connection 120. The anode cell 116 functions, in one case, as an opposing electrode to the object 106, which is connected to the power source 114 and functions as an electrode. The anode cell 116 also pulls excess acid 110 from the bath 108. The acid 110 functions as a solubilizer for solubilized paint 112, such that once the paint 112 is applied to the object 106 excess acid remains in the bath 108. The anode cell 116 is equipped with a membrane 122 housed in a membrane housing (not shown in FIG. 1A). Membrane 122 is used for solute filtration/separation as transmembrane pressure is applied across the membrane 122. A second flexible member 132 is attached to the anode cell 116 and functions to transport the excess acid to a recirculation system 104 as spent anolyte solution. The recirculation system recirculates the spent anolyte solution and supplies fresh anolyte solution to the anode cell 116 via a first flexible member 118. First and second flexible members are commonly implemented, for example, as a flexible hoses (sometimes referred to herein as anolyte hose).

FIG. 1B is a zoomed in view of region 124 of system 100 from FIG. 1A. FIG. 1B depicts anode cell 116 having membrane housing 130 housing membrane 122 and first flexible hose 118 entering from the side of membrane housing 130 via a rim 126 of membrane housing 130 at the upper end of the anode cell 116. Also shown is wired connection 120 entering anode cell 116 via the upper end. The second flexible member (not shown in FIG. 1B) may exit from the side of the membrane housing 130.

FIG. 1B illustrates a technical short coming of the conventional anode cells and anolyte circulation systems for applying E-Coat paint. Particularly, the first flexible member 118 is attached to an inner region of the membrane 122 (e.g., inside of the anode cell as shown in FIG. 1A). Thus, as the first flexible member 118 enters the membrane housing 130, a kink 128 forms at the rim 126 of the anode cell 116. The kink 128 reduces anolyte flow, which causes a buildup of acid in the membrane 122. This buildup of acid can result in premature wear of the anode cell 116. For example, the first flexible member may run to the bottom of the anode cell 116 contained in the membrane housing 130. Fluid can be pushed out of the anode cell 116 via the second flexible member 132. If the flow inhibited, for example due to kink 128, acid may build up in the membrane 122 around the anode cell 116 causing increased wear to the anode cell 116. Further, the reduced flow rate out of the anode cell 116 to the recirculation system 104 can be insufficient to flush out excess acid 110 in the tank 102, resulting in a buildup of acid the bath 108 that reduces the efficiency of the paint 112 to adhere to the object 106.

Accordingly, embodiments disclosed herein provide for system and devices adapted to prevent kinking of the first flexible member 118 on the anode cell 116. The embodiments disclosed herein also provide for methods for improved anolyte flow rates through prevention of kinking, thereby increasing the removal of acid from the bath 108 during the E-Coating process. Through improved flow rate, the lifespan of the anode cells can be lengthened, thereby reducing manufacturing costs of the object 106.

Figures 2A, 2B:
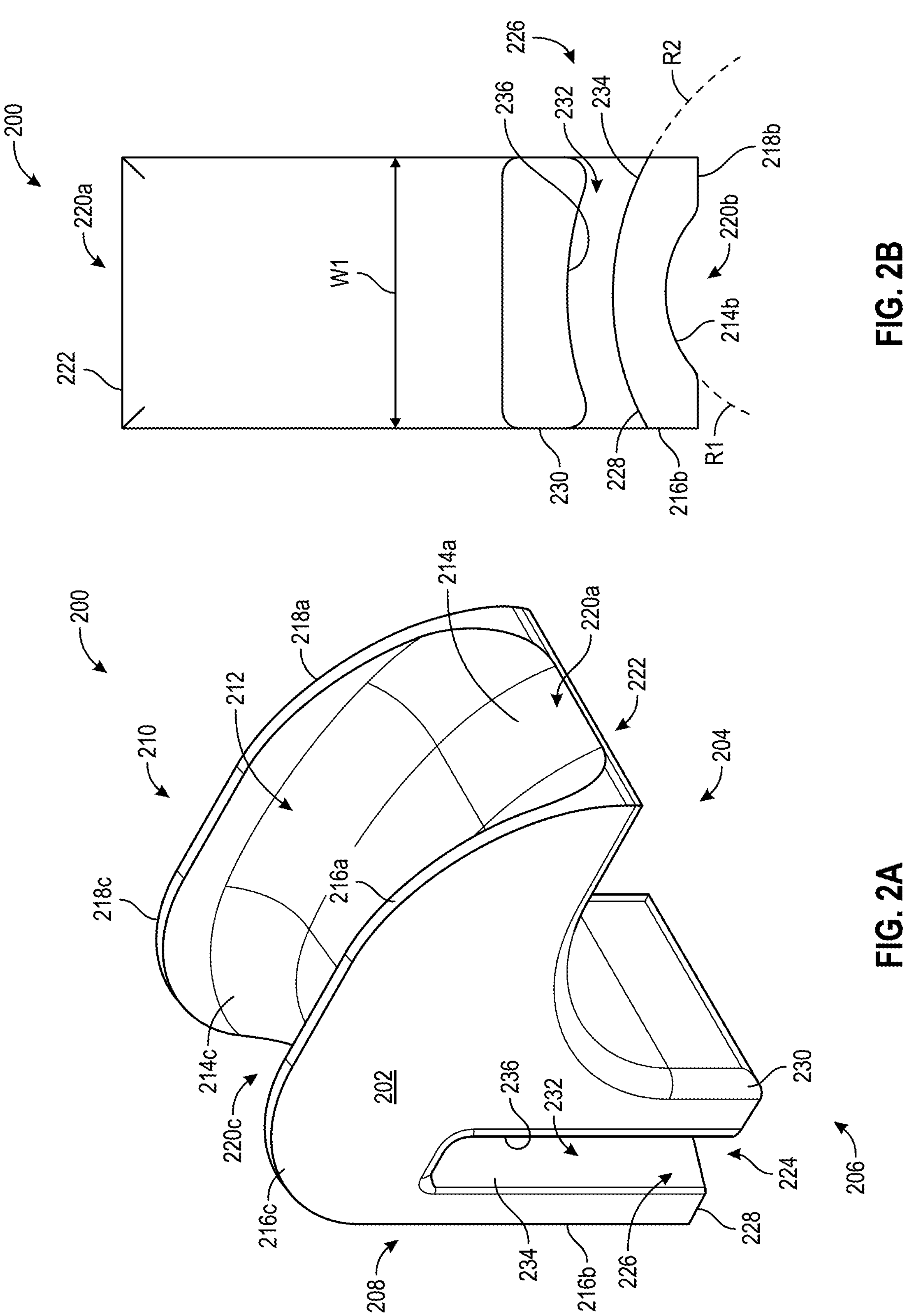
FIG. 2A is a perspective view of an example flexible member guide in accordance with embodiments disclosed herein.
FIG. 2B is a bottom view of the example flexible member guide of FIG. 2A in accordance with embodiments disclosed herein.
Figure 2D:
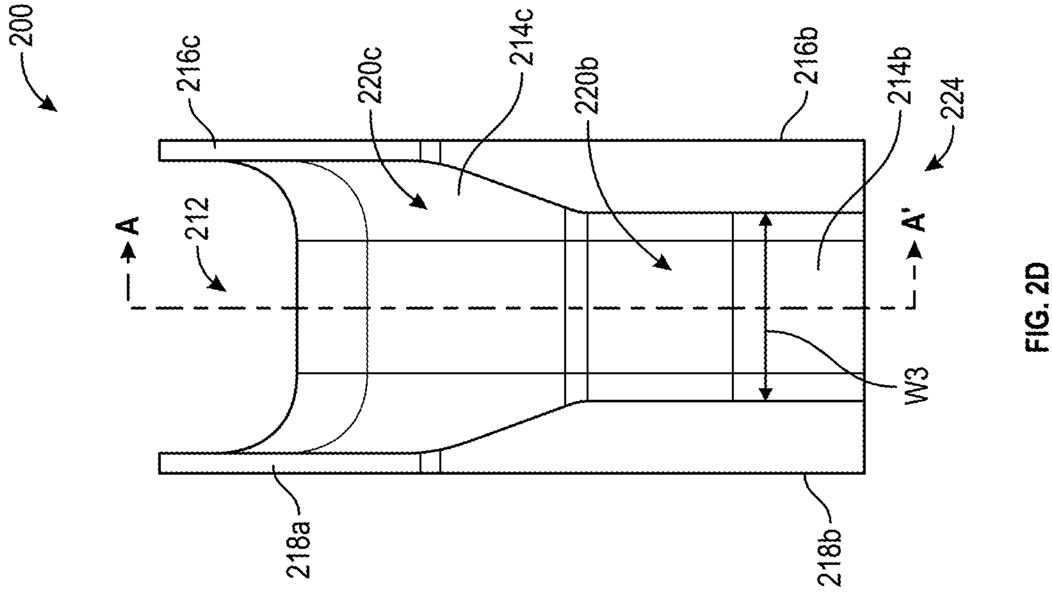
FIG. 2D is a back view of the example flexible member guide of FIG. 2A in accordance with embodiments disclosed herein.
Figure 2C:
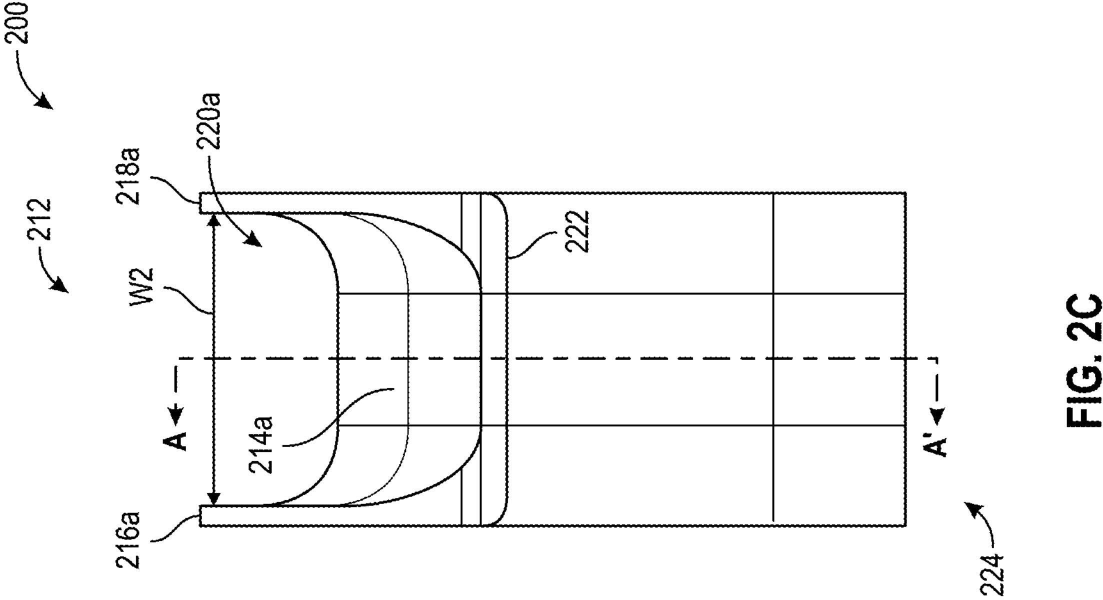
FIG. 2C is a front view of the example flexible member guide of FIG. 2A in accordance with embodiments disclosed herein.
Figure 2E:
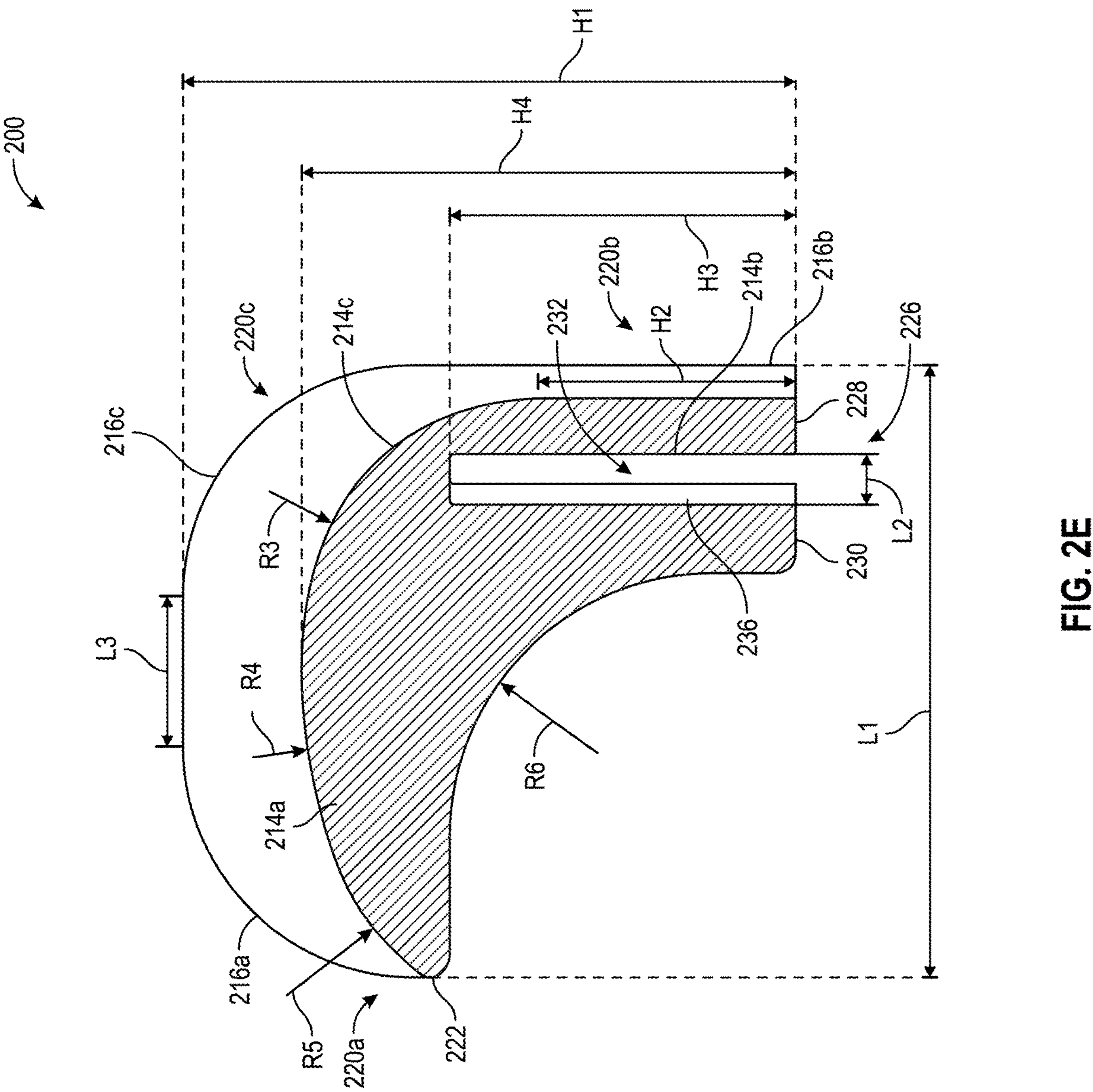
FIG. 2E is a cross-section side view of the example flexible member guide of FIG. 2A in accordance with embodiments disclosed herein.

FIGS. 2A-2E depict an example flexible member guide 200 in accordance with embodiments disclosed herein. FIG. 2A is a perspective view of flexible member guide 200 having a body 202 having a height H1, width W1, and length L1 and comprising first side 204, second side 206, third side 208, and fourth side 210. FIG. 2B is a bottom-side view of flexible member guide 200 viewed from second side 206, FIG. 2C is a front-side view of flexible member guide 200 viewed from first side 204, and FIG. 2D is a back-side view of flexible member guide 200 viewed from third side 208. FIGS. 2C and 2D include cross-sectional plane A-A' and FIG. 2E is a cross-section side view of flexible member guide 200 viewed along plane A-A' of FIGS. 2C and 2D.

Flexible member guide 200 comprises a guide structure 212 and a mounting structure 226. The guide structure 212 is adapted to receive a flexible member, such as first flexible member 118 of anolyte circulation system 100, and is shaped to provide a curved guide surface 214 configured to support the first flexible member 118. The guide surface 214 extends between a first end 222 to a second end 224. The first end 222 is being on the first side 204 and the second end 224 being on second side 206. The mounting structure 226 is formed at second end 224 and is adapted to receive mounting structure 226 of membrane housing 130. In operation, third side 208 may extend into the membrane housing 130, so to be surrounded by rim 126.

The guide surface 214 extends between a first side guide member 216 and a second side guide member 218. The guide surface 214 and first side guide member 216 extend from the body 202 toward the fourth side 210 and are formed on opposing faces of the body 202, thereby forming a guide channel 220 recessed into the body 202. The guide channel 220 is sized to receive the flexible member 118. For example, guide channel 220 comprises a width W2, which is sized so as to receive the first flexible member 118. For example, width W2 may be based on the diameter of first flexible member 118, such approximately equal to or larger than the first flexible member 118. In some embodiments, the first side guide member 216 and second side guide member 218 may having a curvature when viewed from first side 204 or second side 206 formed to retain the first flexible member 118 within the guide channel 220. For example, the first side guide member 216 and second side guide member 218 may curve inward toward each other at fourth side 210 so as to overlap with the first flexible member 118 when viewed from fourth side 210. The curved ends of first side guide member 216 and second side guide member 218 may flex outward when first flexible member 118 is inserted into guide channel 220 and then hold first flexible member 118 within guide channel 220 during use.

According to various embodiments, guide channel 220 comprises a plurality of portions, each of which is formed from respective portions of guide surface 214, first side guide member 216, and second side guide member 218. In the illustrative example shown in FIGS. 2A-2E, guide channel 220 includes at least a first portion 220*a*, a second portion 220*b*, and a third portion 220*c*. First portion 220*a* extends in a first direction from first end 222 toward the third side 208 and comprises a first portion 214*a* of guide surface 214, a first portion 216*a* of first side guide member 216, and first portion 218*a* of second side guide member 218. Second portion 220*b* extends from second end 224 toward the fourth side 210 in a second direction and comprises a second portion 214*b* of guide surface 214, a second portion 216*b* of first side guide member 216, and second portion 218*b* of second side guide member 218. The second direction is perpendicular to the first direction such that the second portion 220*b* is generally perpendicular, along plane A-A' of FIGS. 2C and 2D, to the first portion 220*a*. Third portion 220*c* connects first portion 220*a* to second portion 220*b* and comprises curved portion 214*c* of guide surface 214 so as to join first portion 214*a* to second portion 214*b*. Similarly, third portion 216*c* of first side guide member 216 connects first portion 216*a* to second portion 216*b*, and third portion 218*c* of second side guide member 218 connects first portion 218*a* to second portion 218*b*.

Referring to FIGS. 2E, the guide surface 214 comprises a plurality of curvatures along its length. For example, second portion 214*b* is an approximately linear portion of guide surface 214 extending a height H2 from second end 224 toward the first portion 214*a* in the second direction. The third portion 214*c* of guide surface 214 is a curved surface extending from second portion 214*b* and having a radius of curvature R3. Third portion 214*c* of guide surface 214 connects to first portion 214*a* at height H4, and first portion 214*a* extends in the first direction toward the first end 222. In some embodiments, the first portion 214*a* may be approximately linear along its entire length (e.g., from third portion 214*c* to first end 222). In another embodiment, the first portion 214*a* may be linear for a section of first portion 214*a* and comprises one or more curvatures. For example, as shown in FIG. 2E, first portion 214*a* comprises a radius curvature R4 and a radius of curvature R5 that curve in downward toward first end 222 in the second direction. According to various embodiments, the radius R3 and radius R5 are smaller than the radius R4, for example, R3 may be half of R4 or less. In some embodiments, radius R3 is approximately equal to radius R5.

The curvature of guide surface 214 is selected so as to apply uniform supportive forces to first flexible member 118 when received within guide channel 220. For example, the approximately linear second portion 214*b* of guide surface 214 can function to feed an end of first flexible member 118 into the anode cell 116 (e.g., into the membrane housing 130). The flexible member guide 200 then provides body 202 to hold first flexible member 118 off of rim 126 to prevent kinking as described above in relation to FIG. 1B. The curvature of third portion 214*c* of guide surface 214 is selected such that the first flexible member 118 is in contact with third portion 214*c* along the entire length of third portion 214*c* of guide surface 214, such that a supportive force is uniformly applied to the first flexible member 118. The curvature of first portion 214*a* may also be selected so as to provide a uniform supportive force to the first flexible member 118 along the length of first portion 214*a* due to contact between first portion 214*a* and first flexible member 118. The radius R5 may provide a smooth lip selected so as to avoid a pinch point or kinking point as the first flexible member 118 exits the guide channel 220.

The side guide members 216 and 218 are complimentary formed and constrain any lateral movement of the first flexible member 118. The first portion 216*a* and first portion 218*a* may include respective first curved sections beginning at first end 222 and curving to respective liner sections. The linear sections extend for a length L3 to respective third portions 216*c* and 218*c*, which comprise respective curved sections that connect to second portions 216*b* and 218*b*, respectively. The second portions 216*b* and 218*b* can be linear portions that extend to second end 224.

Guide channel 220 comprises one or more widths defined by the distance between inner surfaces of first side guide member 216 and second side guide member 218. For example, as shown in FIGS. 2C and 2D, first portion 220*a* and third portion 220*c* of guide channel 220 comprise a width of W2. In some embodiments, second portion 220*b* may also comprise width W2. In another example, the width of guide channel 220 tapers at the transition between third portion 220*c* and second portion 220*b*, as shown in FIG. 2D. In this case, the width of guide channel 220 may taper down to a width W3. As a result, second portion 220*b* has a radius R1 that is recessed into body 202 to a lesser degree than first portion 220*a*, as shown in FIG. 2B.

As alluded to above, mounting structure 226 is configured to receive rim 126, which permits mounting structure 226 to maintain a relative position of flexible member guide 200 relative to the anode cell 116. For example, mounting structure 226 comprises a fork-like construction that includes a plurality of tines having one or more mounting spaces therebetween. For example, in the illustrative embodiment shown in FIGS. 2A-2E, mounting structure 226 comprises a first mounting structure 228 and a second mounting structure 230 (also referred to as first and second mounting tines), each extending from second end 224 toward the fourth side 210. First mounting structure 228 comprises first mounting surface 234 facing second mounting surface 236 of second mounting structure 230 providing for mounting space 232 therebetween.

The mounting space 232 is sized so to removably couple the body 202 to an object, such as rim 126 of membrane housing 130. In various embodiments, mounting space 323 comprises a length L2 that is sized according to a thickness of rim 126 of membrane housing 130. For example, the length L2 is selected so to receive rim 126 and provide a secure fit, for example, such that second mounting surface 236 and first mounting surface 234 contact respective surfaces of membrane housing 130.

First mounting surface 234 and second mounting surface 236 extend a distance H3 into body 202 from second end 224, as shown in FIG. 2E. Distance H3 is less than height H4, and more preferably is lower than a point of third portion 214*c* of guide surface 214 that coincides with mounting space 232 when viewed from fourth side 210. In an example implementation, distance H3 is greater than height H2. However, distance H3 may be less than distance H2 according to some implementations. Larger distance of H3 may provide for increasingly secure mounting of flexible member guide 200 onto membrane housing 130. Height H3 may be provided such that the flexible member guide 200 it is long enough to securely hold flexible member guide 200 in place with respect to the membrane housing (e.g., membrane housing 130 of FIG. 1B), while being short enough for easy removal by users. Generally, the flexible member guide 200 may need to be removed during replacement of anode cell 116.

Mounting space 232 extends through the body 202 (e.g. from one face to the other face). In some embodiments, mounting space 232 may be generally linear through body 202, for example, first mounting surface 234 and second mounting surface 236 may be planar surfaces that are approximately perpendicular to second side 206 and parallel to third side 208. Thus, in this case, first mounting surface 234 and second mounting surface 236 can be generally parallel to second portion 214*b*.

In another embodiment, first mounting surface 234 and second mounting surface 236 may be curved surfaces, for example, as shown in FIG. 2B. For example, second mounting surface 236 and first mounting surface 234 may comprise a curvature having a radius of R2, where the center of curvature of surfaces 236 and 234 are offset from each other by distance L2 along plane A-A' shown in FIGS. 2C and 2D. Radius R2 can be selected according to a radius of rim 126, so to receive rim 126 without inducing a bend or potential deformation of body 202 due to a curvature of rim 126.

In an illustrative embodiment, dimensions of an example flexible member guide 200 is provided herein. All example dimensions disclosed herein are subject to manufacturing tolerances. For example, each dimension is within a tolerance of approximately ±1 mm of the example dimension value. For example, length L1 may be approximately 53 mm, height H1 may be approximately 53 mm, and width W1 may be approximately 25 mm. In this embodiment, width W2 of the guide channel 220 may be approximately 22.23 mm and side guide members may have a width of approximately 1.39 mm. In an embodiment, the width W3 may be approximately 15 mm. The height H2 of the second portion 214*b* may be approximately 22.38 mm and height H4 may be 40 mm. The third portion 214*c* may have a radius of curvature R3 of approximately 20 mm. In some embodiments, the first portion 214*a* may have a radius of curvature R3 of approximately 20 mm and a radius of curvature R4 of approximately 50 mm. A radius of curvature R6 of body 202 may be approximately 23.23 mm. The portions 216*a* and 218*a* of side guide members 216 and 218 may have a radius of curvature of 20 mm and a length L3 of approximately 13 mm. The mounting spaces 232 may have a height H3 of approximately 30 mm and a length L2 of 4.27 mm. In some embodiments, the mounting surfaces 234 and 236 may have a radius of curvature R2 of approximately 25.95 mm and the second portion 214*a* may have a radius of curvature R1 of approximately 25 mm.

Figure 3:
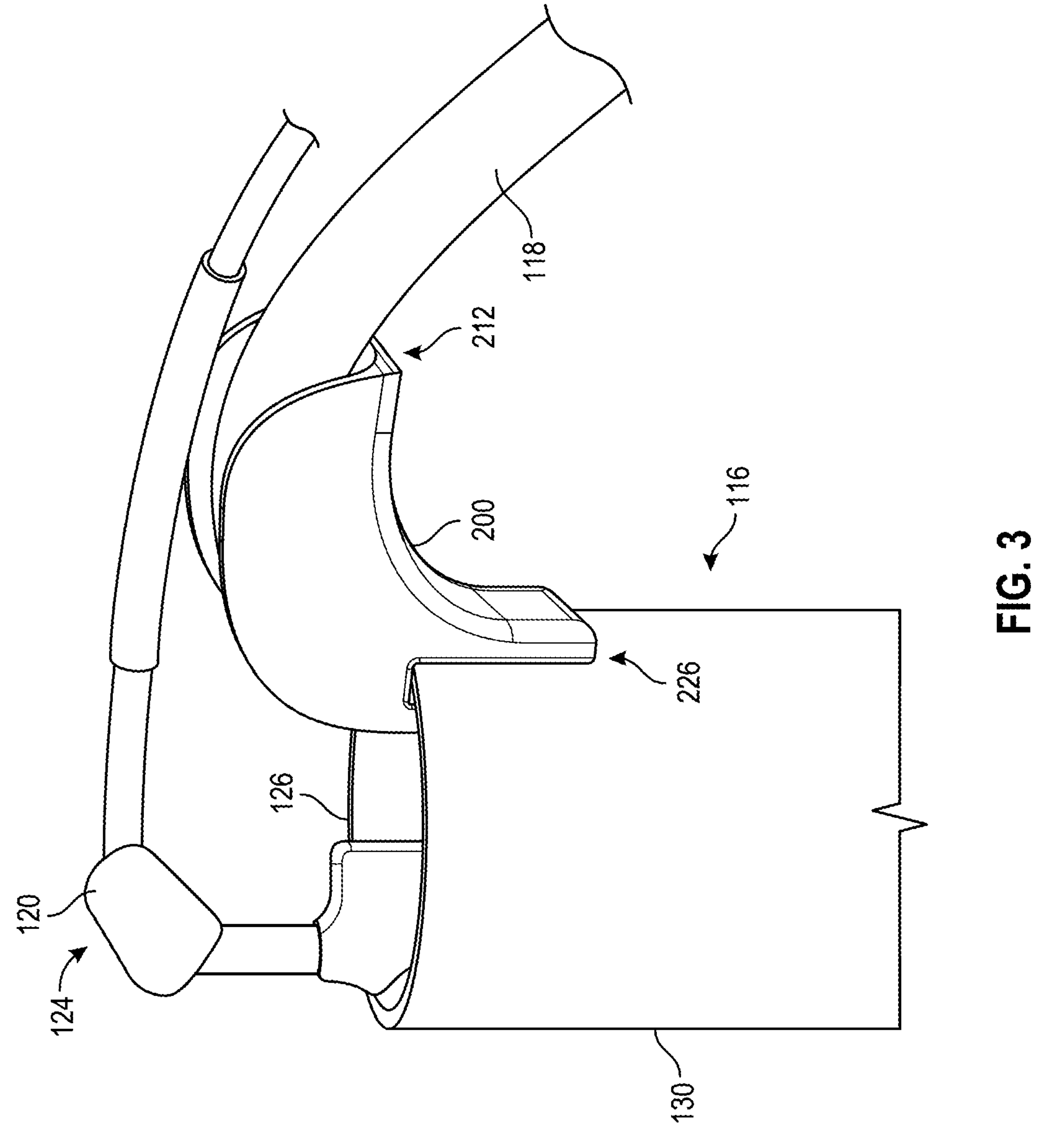
FIG. 3 is a zoomed in view of the region of the system of FIG. 1A in which the example flexible member guide of FIG. 2A is implemented in accordance with embodiments disclosed herein.

FIG. 3 is a zoom in view of region 124 of system 100 from FIG. 1A having an embodiment of the present disclosure installed therein. FIG. 3 depicts anode cell 116 having membrane housing 130 housing membrane 122 and first flexible hose 118 exiting to the side of membrane housing 130 via a rim 126 of membrane housing 130 at the upper end of the anode cell 116. Also shown is second flexible member 120 entering anode cell 116 via the upper end. Flexible member guide 200 is mounted to rim 126 in the case of FIG. 3, such that first flexible member 118 is received in guide structure 212 and fed into membrane housing 130. Mounting structure 226 receives rim 126 thereby securing flexible member guide 200 to membrane housing 130.

As shown in FIG. 3, first flexible member 118 does not experience a kink (e.g., kink 128) as in the case of FIG. 1B. The first flexible member 118 rests in guide channel 220, which applies supportive forces along the length of the first flexible member 118. As a result, first flexible member 118 does not kink and anolyte flow rate not subdued. Accordingly, embodiments disclosed herein provide for improved anolyte flow rates through prevention of kinking, thereby increasing the removal of acid from bath 108 during the E-Coating process. Through improved flow rate, the lifespan of the anode cell 116 can be lengthened, thereby reducing manufacturing costs of the object 106.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for electrodeposition coating, the system comprising:
- a flexible member configured to transport excess acid from an electrodeposition coating (E-Coating) bath during E-Coating of an object;
- an anode cell comprising a membrane housing; and
- a flexible member guide comprising
  - a guide channel comprising a first portion extending in a first direction and a second portion extending in a second direction perpendicular to the first direction; and
  - a mounting structure comprising a plurality of mounting tines extending in the second direction with at least one space between the plurality of mounting tines,
- wherein the flexible member guide is configured to receive a rim of the membrane housing, and to receive the flexible member in a first direction via a guide channel and direct an end of the flexible member into the membrane housing along a second direction that is perpendicular to the first direction.

2. The system of claim 1, wherein the at least one space is sized to receive the rim of the membrane housing.

3. The system of claim 1, wherein the guide channel comprises a third portion connecting the first portion to the second portion, wherein the third portion comprises a first curved surface.

4. The system of claim 3, wherein the first portion comprises a second curved surface, wherein the first curved surface has a radius smaller than the second curved surface.

5. The system of claim 4, wherein the first portion comprises a third curved surface having a radius that is approximately equal to the radius of the first curved surface.

6. The system of claim 1, wherein the second portion is approximately linear in the second direction.

7. The system of claim 1, wherein each of the plurality of mounting tines comprise surfaces that are curved.

8. The system of claim 1, wherein the guide channel comprises a width between a first guide member and a second guide member, the width sized to receive the flexible member.

9. The system of claim 8, wherein the width at first point of the guide channel tapers down to smaller width at second point of the guide channel.

10. A system for electrodeposition coating, the system comprising:

a flexible member configured to transport excess acid from an electrodeposition coating (E-Coating) bath during E-Coating of an object;

an anode cell comprising a membrane housing; and a flexible member guide comprising:

a guide channel comprising a first portion extending in a first direction and a second portion extending in a second direction perpendicular to the first direction; and a mounting structure comprising a plurality of mounting tines extending in the second direction with at least one space between the plurality of mounting tines, wherein the flexible member guide is configured to receive a rim of the membrane housing, and to receive the flexible member in a first direction via a guide channel and direct an end of the flexible member into the membrane housing along a second direction that is perpendicular to the first direction, wherein the guide channel comprises a plurality of portions, wherein a first portion of the plurality of portions extends in a first direction and a second portion of the plurality of portions extends in a second direction perpendicular to the first direction, wherein the plurality of mounting tines extend in the second direction, wherein the guide channel comprises a third portion connecting the first portion to the second portion, and wherein the third portion comprises a first curved surface.

11. The system of claim 10, wherein the at least one space is sized to receive the rim of the membrane housing.

12. The system of claim 11, wherein the first portion comprises a second curved surface, wherein the first curved surface has a radius smaller than the second curved surface.

13. The system of claim 12, wherein the first portion comprises a third curved surface having a radius that is approximately equal to the radius of the first curved surface.

14. The system of claim 10, wherein the second portion is approximately linear in the second direction.

15. The system of claim 10, wherein each of the plurality of mounting tines comprise surfaces that are curved.

16. The system of claim 10, wherein the guide channel comprises a width between a first guide member and a second guide member, the width sized to receive the flexible member.

17. The system of claim 16, wherein the width at first point of the guide channel tapers down to smaller width at second point of the guide channel.

18. A system for electrodeposition coating, the system comprising:

a flexible member configured to transport excess acid from an electrodeposition coating (E-Coating) bath during E-Coating of an object;

an anode cell comprising a membrane housing; and a flexible member guide comprising:

a guide channel comprising a first portion extending in a first direction and a second portion extending in a second direction perpendicular to the first direction; and a mounting structure comprising a plurality of mounting tines extending in the second direction with at least one space between the plurality of mounting tines, wherein the flexible member guide is configured to receive a rim of the membrane housing, and to receive the flexible member in a first direction via a guide channel and direct an end of the flexible member into the membrane housing along a second direction that is perpendicular to the first direction, wherein the guide channel comprises a plurality of portions, wherein a first portion of the plurality of portions extends in a first direction and a second portion of the plurality of portions extends in a second direction perpendicular to the first direction, wherein the second portion is approximately linear in the second direction, and wherein the plurality of mounting tines extend in the second direction.

19. The system of claim 18, wherein the at least one space is sized to receive the rim of the membrane housing.

20. The system of claim 18, wherein each of the plurality of mounting tines comprise surfaces that are curved.

* * * * *